United States Patent
Manohar et al.

(10) Patent No.: US 8,964,795 B2
(45) Date of Patent: Feb. 24, 2015

(54) ASYNCHRONOUS PIPELINED INTERCONNECT ARCHITECTURE WITH FANOUT SUPPORT

(75) Inventors: Rajit Manohar, Ithaca, NY (US); Clinton W. Kelly, San Jose, CA (US); Virantha Ekanayake, San Jose, CA (US)

(73) Assignee: Achronix Semiconductor Corporation, Santa Clara, CA (US)

( * ) Notice: Subject to any disclaimer, the term of this patent is extended or adjusted under 35 U.S.C. 154(b) by 456 days.

(21) Appl. No.: 12/475,744

(22) Filed: Jun. 1, 2009

(65) Prior Publication Data
US 2010/0303067 A1    Dec. 2, 2010

(51) Int. Cl.
*H04J 3/02* (2006.01)
*H04L 12/947* (2013.01)

(52) U.S. Cl.
CPC ............................. *H04L 49/25* (2013.01)
USPC ............................................ 370/540; 326/38

(58) Field of Classification Search
CPC ........................... H04L 49/10; G06F 17/5059
USPC ......................... 370/362–364, 540; 326/38
See application file for complete search history.

(56) References Cited

U.S. PATENT DOCUMENTS

| | | | |
|---|---|---|---|
| 5,396,491 A | 3/1995 | Newman | |
| 5,541,916 A | 7/1996 | Nobuyuki | |
| 6,961,741 B2 | 11/2005 | Swami | |
| 7,157,934 B2 | 1/2007 | Teifel | |
| 7,759,974 B1 | 7/2010 | Young | |
| 8,300,635 B2 | 10/2012 | Ekanayake et al. | |
| 2002/0019904 A1 | 2/2002 | Katz | |
| 2002/0116426 A1 | 8/2002 | Swami | |
| 2008/0175259 A1 | 7/2008 | Chao et al. | |
| 2010/0013517 A1 | 1/2010 | Manohar et al. | |
| 2011/0058570 A1 | 3/2011 | Ekanayake et al. | |
| 2011/0121857 A1 | 5/2011 | Nowick et al. | |

FOREIGN PATENT DOCUMENTS

| | | |
|---|---|---|
| WO | WO-2008008629 A2 | 1/2008 |
| WO | WO-2008008629 A3 | 1/2008 |
| WO | WO-2008008629 A4 | 1/2008 |

OTHER PUBLICATIONS

"International Application Serial No. PCT/US2007/072300, International Search Report and Written Opinion mailed Sep. 24, 2008", 10 pgs.
"U.S. Appl. No. 12/557,287, Response filed Jan. 13, 2012 to Non Final Office Action mailed Oct. 14, 2011", 8 pgs.
"U.S. Appl. No. 12/557,287, Non Final Office Action mailed Oct. 14, 2011", 6 pgs.
"U.S. Appl. No. 12/557,287, Notice of Allowance mailed Jun. 27, 2012", 8 pgs.

*Primary Examiner* — Dang Ton
*Assistant Examiner* — Kevin Lee
(74) *Attorney, Agent, or Firm* — Schwegman Lundberg & Woessner, P.A.

(57) ABSTRACT

Circuits comprising an asynchronous programmable interconnect with fan out support that include a multi-port switch and a first and second buffer-switch circuit, and methods of forming such circuits, are provided. Additional circuits and methods are disclosed.

22 Claims, 5 Drawing Sheets

ASYNCHRONOUS PIPELINED INTERCONNECT ARCHITECTURE WITH FANOUT SUPPORT

BACKGROUND

Flexibility in interconnects is a useful feature for modern reconfigurable circuit systems. Interconnect flexibility may be achieved by introducing configuration bits and switches along with other circuits such as signal buffer circuits to enable programmable connectivity between the endpoints of flexible interconnects.

BRIEF DESCRIPTION OF THE DRAWINGS

Some embodiments of the disclosed technology are illustrated by way of example and not limitation in the figures of the accompanying drawings in which.

DETAILED DESCRIPTION

Example methods to form, and circuits to implement an asynchronous programmable interconnect with fan out support will now be described. In the following description, numerous examples having example-specific details are set forth to provide an understanding of example embodiments. It will be evident, however, to one skilled in the art that the present examples may be practiced without these example-specific details, and/or with different combinations of the details than are given here. Thus, specific embodiments are given for the purpose of simplified explanation, and not limitation.

Some example embodiments described herein may include a method comprising forming a multi-port switch point. The multiport switch point (e.g., a four-port switch point) may comprise a plurality of ports (e.g., four ports). The method may include forming a first buffer-switch circuit (e.g., an asynchronous buffer connected to a number of switch-boxes) to provide a first set of programmable asynchronous connections between all ports of the plurality of ports. The first buffer-switch circuit may fan out multiple control signals (e.g., acknowledge signals). The method may further include connecting a second buffer-switch circuit to provide a second set of programmable asynchronous connections between a selected number of ports (e.g., three ports) of the multi-port switch point. In example embodiments, the second buffer-switch circuit may also provide a set of programmable asynchronous connections between all ports (e.g., three ports) of the multi-port switch point. Reconfigurable asynchronous circuits that can be formed in this way, and in other ways, will now be described.

Figure 1:
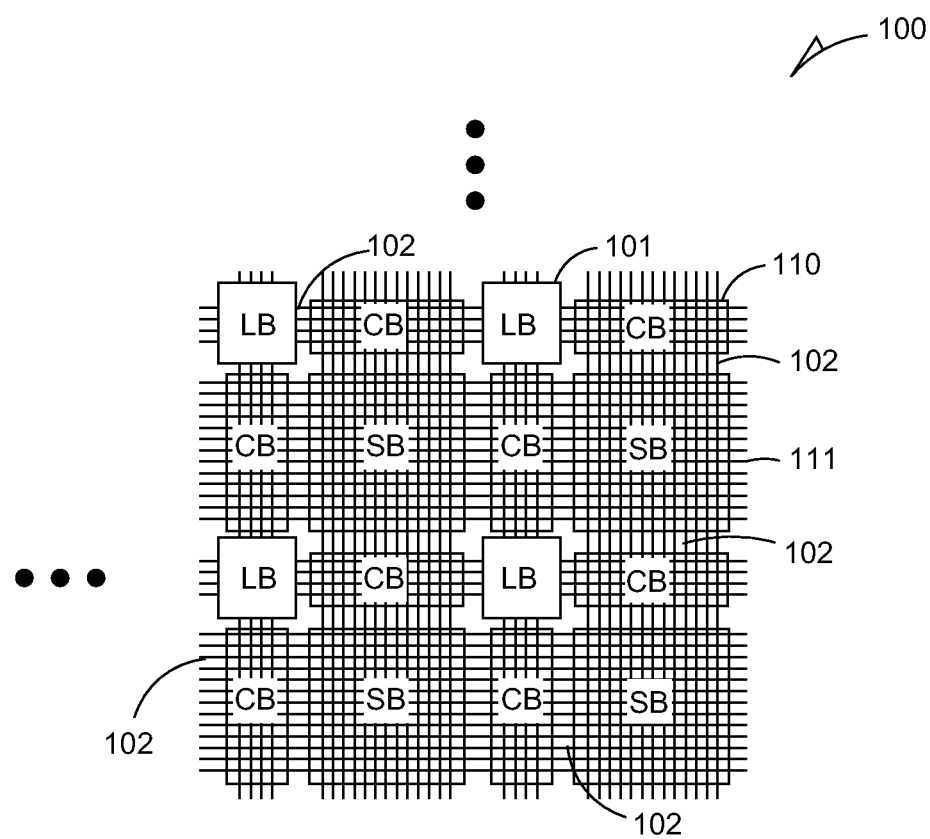
FIG. 1 illustrates an example island-style architecture of a reconfigurable system, according to various embodiments of the invention.

FIG. 1 illustrates an example island-style architecture of a reconfigurable asynchronous integrated circuit 100, according to various embodiments of the invention. The reconfigurable asynchronous integrated circuit 100 may contain a programmable array of logic blocks (LBs) 101 to support a variety of programmable logic functions. A number of routing tracks 102 (or "tracks" 102) in the architecture may be used to implement a flexible routing and interconnect scheme. Elements of the flexible routing and interconnect schemes (e.g., programmable pipelined asynchronous interconnects discussed below) include connection blocks (CBs) 110 and switch blocks (SBs) 111. The structure of the connection blocks 110 and switch blocks 111 may determine the flexibility of connections supported by the reconfigurable asynchronous integrated circuit 100.

Clocked systems may suffer from a number of inherent drawbacks. For example, pipelined logic circuits are typically employed in field programmable gate arrays (FPGAs) in which groups of logic blocks or elements are connected in sequence to carry out a desired complex logic operation. The depth (i.e. number of logic blocks in the sequence) of one or more pipelines may be changed to modify the FPGA's programming. Changing local pipeline depths in a clocked system may utilize global retiming of the entire system since the delays imposed by the pipeline may vary with the pipeline's depth.

Adding high-speed retiming hardware support to a clocked FPGA incurs a significant register overhead. In addition, clocked FPGAs are prone to delay variation induced errors that can result from temperature and supply voltage fluctuations, as well as from physical imperfections of the circuit chip, for example. Further, clocked FPGAs are not efficient from an energy usage standpoint because all of the logic gates in the array are enabled by each clock pulse, even when many of the gates are not required for a given computation.

Unlike synchronous reconfigurable systems that rely on use of a global or a system clock to synchronize operations of the various logic gates in the systems, the asynchronous reconfigurable integrated circuit 100 does not necessarily involve any global or system clock. The use of asynchronous circuits in programmable logic arrays and the like can overcome the foregoing drawbacks associated with clocked FPGAs and other clocked circuits.

The introduction of pipelining in an asynchronous programmable interconnect architecture, as shown in FIG. 1, may not allow the use of fan out. For example, if a single signal is sent to two destinations along a pipelined asynchronous interconnect, then multiple replicas of the signal may be sent onward along independent interconnect lines, which may result in, for example, increased power consumption, increased die area, and reduced processing speed.

Conventional synchronous interconnects may support fan out in a straightforward manner by simply connecting all destinations to each other by switches. However, for the reasons described below, this solution is not compatible with an asynchronous pipelined interconnect. To solve this problem, various embodiments augment the programmable circuitry in the pipelined interconnect (e.g., at switch blocks 111 or connection blocks 110) to allow sharing interconnect lines by introducing buffer-switch circuits (e.g., buffer-switch circuits 500 and 600 of FIGS. 5 and 6).

In an asynchronous programmable interconnect, such as the interconnects at connection blocks 110 and switch blocks 111 of FIG. 1, each routing track 102, interconnecting logical blocks 101, may be formed by using a bundle of wires that implement an asynchronous communication channel.

Figure 2:
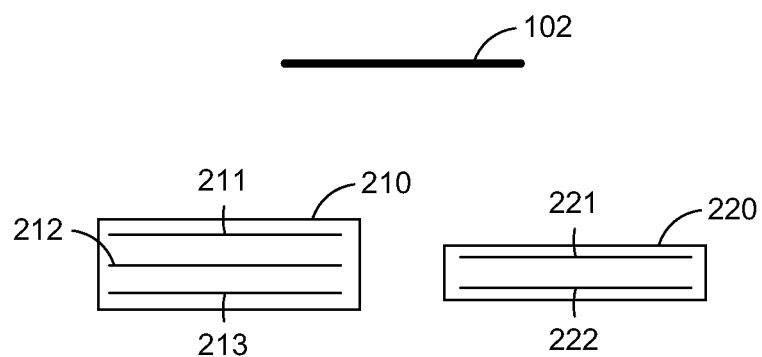
FIG. 2 illustrates examples of an asynchronous routing track, as shown in FIG. 1, according to various embodiments of the invention.

For example, FIG. 2 illustrates examples of an asynchronous routing track 102, as shown in FIG. 1, according to various embodiments of the invention. Different methods to implement an individual routing track 102 when using a programmable pipelined asynchronous interconnect may exist. The routing track 102 may be fabricated using a three-wire implementation 210 or a two-wire implementation 220. There are also known methods for implementing the track 102 using a single wire and multi-voltage logic.

In the three-wire implementation 210, data wires 211 and 212 may be used to send data signals, while wire 213 may be used for a control signal (e.g., acknowledge signal). In the two-wire implementation 220 (sometimes referred to as a "single track"), wires 221 and 222 may be used for both data and acknowledge signals. These wires 221, 222 can be used to implement a wide variety of asynchronous communication protocols, as is well-known in the art.

Other possible implementations of routing track 102 are also possible, where an individual track 102 can be used to route more than one bit of information, such that the entire programmable routing may contain heterogeneous protocols, bit-widths, and wire configurations. The example embodiments of the programmable pipelined asynchronous interconnect discussed below may use the three-wire implementation 210 and a standard four-phase handshake protocol for communication with one bit per routing track. However, the technology introduced herein is not limited to three-wire implementation (e.g., two-wire and one-wire implementations can also be used) and can be applicable to other implementations of the routing track and handshake protocols.

Figure 3:
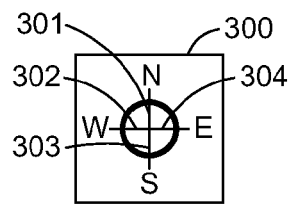
FIG. 3 illustrates an example multi-port switch point included in the switch blocks (SB) shown in FIG. 1, according to various embodiments of the invention.

Each of switch blocks 111 or connection blocks 110 of FIG. 1 may be formed by implementing a number of multi-port switch points. For example, FIG. 3 illustrates an example multi-port switch point 300 included in the switch blocks 111 shown in FIG. 1, according to various embodiments of the invention. In the example embodiments described herein, the switch blocks 111 may be implemented by a number of multi-port switch points 300. Also, the multi-port switch point 300 may be a programmable asynchronous pipelined multi-port switch point.

The multi-port switch point 300 may be introduced at locations in switch block 111 where two routing tracks 102 intersect. The multi-port switch point 300 may, for example, comprise four ports, a north (N) port 301, a west (W) port 302, a south (S) port 303, and an east (E) port 304. Each port of the multi-port switch point 300 may comprise a number of nodes (e.g., 3 nodes). Each node may be connected to a wire of a routing track 102 (e.g., data wire or acknowledge wire). While the multi-port switch point 300 is shown in FIG. 3 as if all routing tracks are connected to nodes, the drawing is to be considered as merely a symbol for the multi-port switch point 300, and does not correspond to any particular physical implementation. Example physical implementations of the multi-port switch point 300 will now be described.

Figure 4:
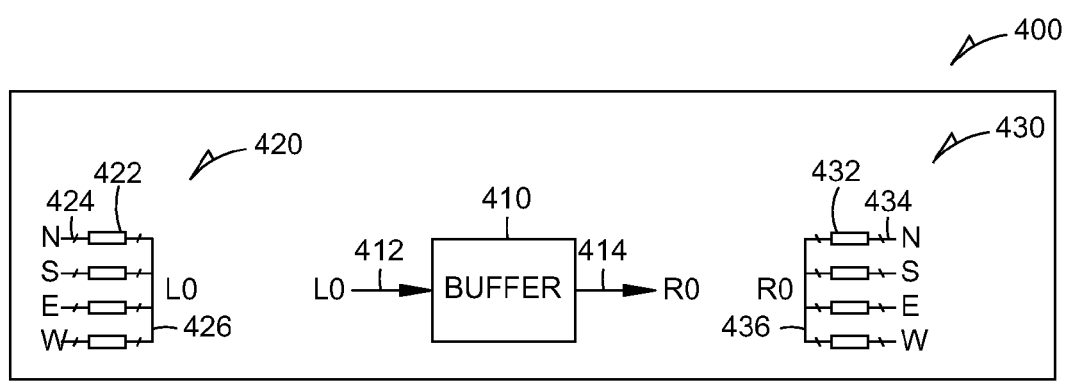
FIG. 4 is a block diagram illustrating example buffer-switch circuits for selectively connecting all ports of the multi-port switch point shown in FIG. 3, according to various embodiments of the invention.
Figure 4:
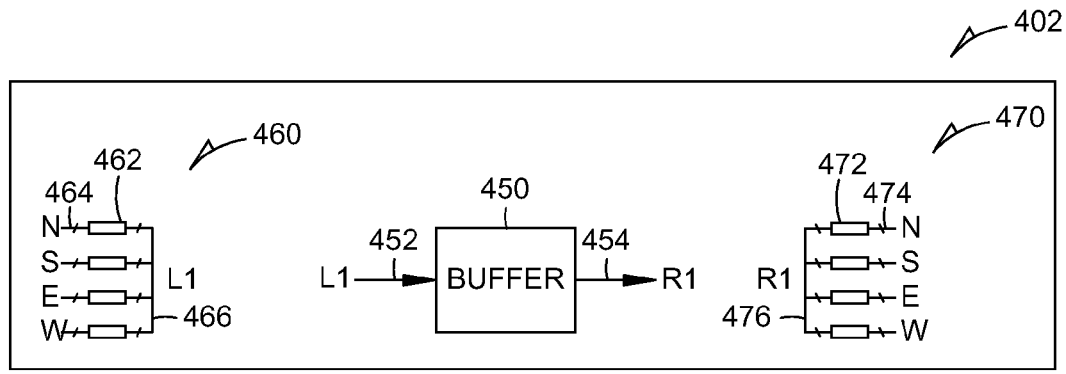

For example, FIG. 4 is a block diagram illustrating example buffer-switch circuits 400 and 402 for selectively connecting all ports of the multi-port switch point 300 shown in FIG. 3, according to various embodiments of the invention. Thus, the buffer-switch circuits 400 and 402 comprise example implementations of the multi-port switch point 300 of FIG. 3.

Programming logic for the multi-switch port 300 enables all possible combinations of connections between the four ports of the multi-switch port 300. The programming logic may control switch-boxes 422, 432, 462, and 472 of buffer-switch circuits 400 and 402.

In an example embodiment, pipelined data and control signals may be introduced by using asynchronous buffer circuits (or first-in-first-out (FIFO) stages) 410 and 450. Also shown in FIG. 4 are a first and a second set of switch-boxes 420 and 430. Each of the first and second sets 420, 430 of switch-boxes may comprise a number of individual switch-boxes (e.g., switch-boxes 422 and 432). The first set 420 of switch-boxes may selectively connect the ports 301-304 of the multi-port switch point 300 in FIG. 3 (connected to corresponding endpoints 424 of the first set of switch-boxes 420) to an input 412 of the first asynchronous buffer circuit 410 (connected to the first set of switch-boxes 420 at endpoints 426). The second set 430 of switch-boxes may selectively connect an output 414 of the asynchronous buffer circuit 410 (connected to the second set of switch-boxes 430 at endpoints 436) to the ports 301-304 of the multi-port switch point 300 (connected to corresponding endpoints 434 of the second set of switch-boxes 430).

Similarly, the third and the fourth sets 460, 470 of switch-boxes in the buffer-switch circuit 402 may be respectively connected to an input 452 and an output 454 of the second asynchronous buffer 450 (at endpoints 466 and 476 of the third and fourth set of switched 460 and 470, respectively) to provide further programmable (e.g., selective) connectivity between the ports 301-304 of the multi-port switch point 300. The programming logic for the multi-port switch point 300 may permit various combinations of selective connections between ports 301-304 of the multi-port switch point 300. For example, to connect the N port 301 to both E port 304 and S port 303, the programming logic may use the buffer-switch circuit 400 to connect N port 304 to E port 304 and the buffer-switch circuit 402 to connect the N port 301 to S port 303.

The programming logic may connect the N port 301 to E port 304, by changing the conduction state of the switch-box 422 N (that is connected to an endpoint 424 with label N) and the switch-box 432E (that is connected to an endpoint 434 with label E) to conductive. Similarly, for connecting the N port 301 to the S port 303, the programming logic may change the conduction state of the switch-box 462 N (that is connected to an endpoint 464 with label N) and the switch-box 472 S (that is connected to an endpoint 474 with label S) to conductive. Each switch-box (e.g., 422) may comprise multiple switches, each connected via a separate wire to a corresponding node of the corresponding port of the multi-port switch point 300 or to a corresponding node of the input or output of the asynchronous buffer (e.g., the asynchronous buffer circuit 410).

According to example embodiments, each port of the multiport switch 300 of FIG. 3 may comprise multiple nodes, with each node potentially connected to a wire of a routing track 102 of FIG. 2. In example embodiments, each of the switches of a switch-box (e.g., the switch-box 422) can be implemented in a variety of ways, either buffered or unbuffered, with full transmission gates or single pass transistors, as evident to a person having ordinary skill in the art.

As shown in FIG. 4, the multi-port switch point 300 of FIG. 3 may be limited to two asynchronous buffer circuits (e.g., 410 and 450), because each multi-port switch point 300 interconnects two independent routing tracks 102 of FIG. 2, so that it cannot support more than two independent input-to-output connections. In example embodiments, a multi-port switch point 300 may be formed with a different topology, and the number of independent routing tracks may determine the number of asynchronous buffers to be used.

A person of ordinary skill in the art will now realize that the asynchronous buffer circuits (e.g., 410 and 450 of FIG. 4) can be implemented in a variety of ways, including a weak-conditioned buffer, a pre-charge half-buffer, and a pre-charge full-buffer, among others. In addition, a specific protocol used by the routing track 102 may also impact the specific circuit configuration used to implement the asynchronous buffer.

A limitation of the programmable asynchronous pipelined multi-port switch point 300 described in FIG. 3 may include preventing a single asynchronous buffer circuit (e.g., 410 or 450) from having more than one destination. This limitation can be caused by the pipelined nature of the pipelined interconnect, as implemented by the multi-port switch point 300. In a non-pipelined interconnect, where a routing unit is an individual signal wire rather than the routing track 102 and the buffer comprises a standard, non-pipelined signal buffer (for example, two inverters, or even an un-buffered wire), connecting the output of such a buffer to multiple destinations is valid. However, this type of connection may be invalid for an asynchronous pipelined multi-port switch point because the asynchronous protocol includes flow-control.

For example, consider an asynchronous routing track 102 of FIG. 2 with the three-wire implementation 210, which may include two data wires 211 and 212 and an acknowledge wire 213. The data wires 211 and 212 may operate to transfer information from a sender to a receiver while the acknowledge wire 213 transfers information from the receiver to the sender. While it is possible to connect data wires from one sender to multiple receivers (fan out), one cannot connect multiple acknowledge wires together because each receiver has an independent acknowledge signal. In other words, the buffer-switch circuits of FIG. 4 are not capable of supporting fan out because programmable asynchronous pipelined multi-port switch points may involve one or more acknowledge signals. To extend the pipelined multi-port switch point 300 concept to support outputs to multiple destinations, the multi-port switch point connectivity may be improved by modifying the buffer-switch circuits as shown in FIGS. 5 and 6.

Figure 5:
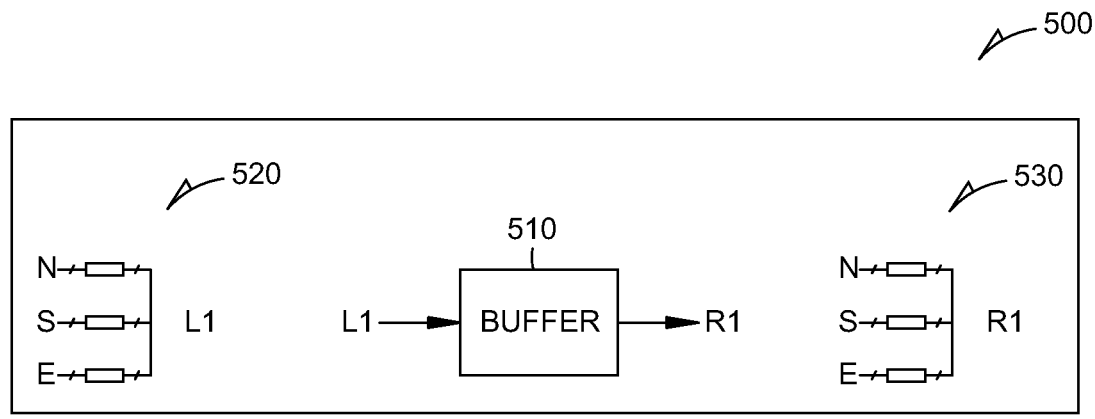
FIG. 5 is a block diagram illustrating an example of a buffer-switch circuit for connecting a selected number of ports of the multi-port switch point shown in FIG. 3, according to various embodiments of the invention.

For example, FIG. 5 is a block diagram illustrating an example of a buffer-switch circuit 500 for connecting a selected number of ports of the multi-port switch point 300 shown in FIG. 3, according to various embodiments of the invention. The change in this buffer-switch circuit, as compared to buffer-switch circuits in FIG. 4, is the reduction in configurability of the connections to the asynchronous buffer 510 (see set of switch-boxes 520 and 530). This reduction can be made to the original buffer-switch circuit 402 of FIG. 4 without sacrificing flexibility in the routing. To support this, connections to the W port 302 of the multi-port switch point 300 of FIG. 3 are assigned to the asynchronous buffer circuit 410 of FIG. 4. Once that is completed, all other possible connections can be supported by the asynchronous buffer 510. This adjustment reduces the area used to implement the programmable multi-port switch point 300 of FIG. 3. The second change, as shown in FIG. 6, is the support of multiple destinations for the output 414 of asynchronous buffer circuit 410 of FIG. 4.

Figure 6:
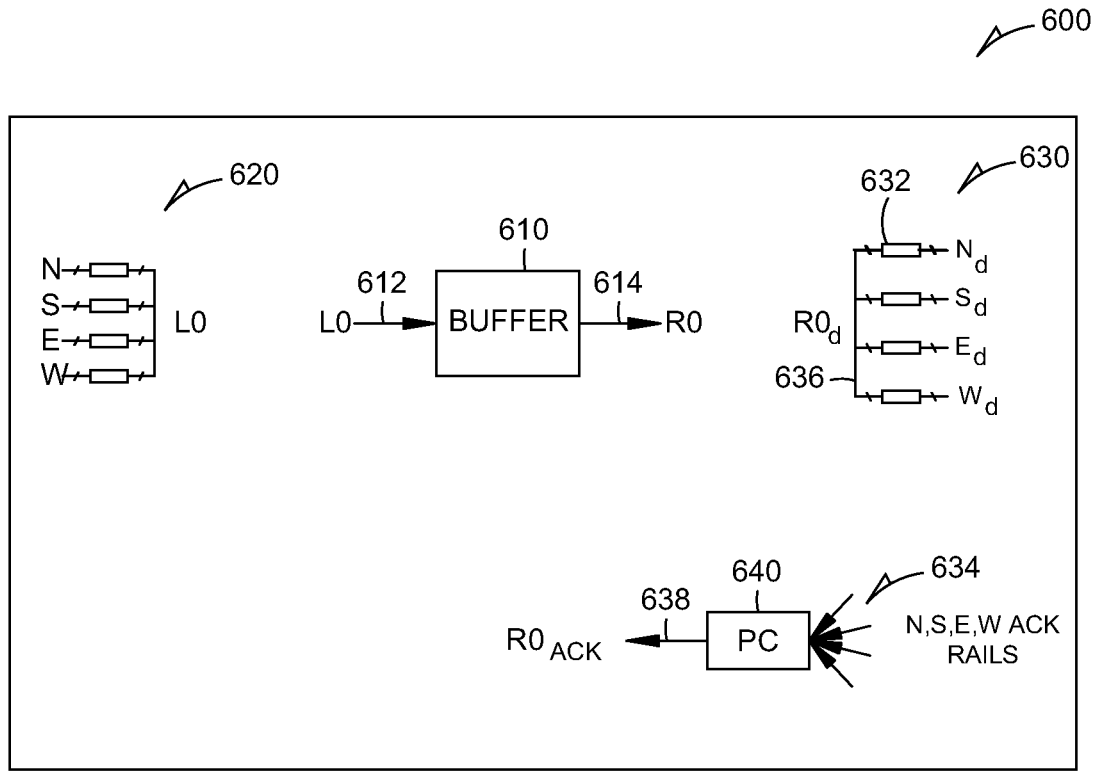
FIG. 6 is a block diagram illustrating an example buffer-switch circuit for connecting data and control nodes of the ports of the multi-port switch point shown in FIG. 3, with fan out support, according to various embodiments of the invention.

For example, FIG. 6 is a block diagram illustrating an example buffer-switch circuit 600 for connecting data and control nodes of the ports of the multi-port switch point 300 shown in FIG. 3, with fan out support, according to various embodiments of the invention. The connectivity to the input of the asynchronous buffer 610 (see the set 620 of switch boxes that connect to input 612) is the same as was presented with respect to the asynchronous buffer circuit 410 of FIG. 4. However, the connectivity to the output 614 of asynchronous buffer 610 has been modified to support fan out.

As discussed above, the wires for the routing track 102 may comprise data wires (e.g., 211 and 212 in FIG. 2) that transfer information from the asynchronous buffer 610 to the ports of the multi-port switch point 300 of FIG. 3 and acknowledge wires (e.g., 213 in FIG. 2) that transfer acknowledge signals from the ports of the multi-port switch point 300 to the asynchronous buffer 610. The set of data wires are directly connected to the output 614 of the buffer via switch-boxes 630. In an example embodiment, each switch-box 632 may comprise two switches coupled to two data nodes of the corresponding port of the multi-port switch point 300.

The acknowledge wires corresponding to the four ports 634 are connected to the asynchronous buffer 610 via a programmable completion detection element 640. The programmable completion detection element 640 combines the four acknowledge signals into a single acknowledge signal at an acknowledge node 638 that can be connected to an acknowledge node of the output 614 of the asynchronous buffer 610. The programmable completion detection element 640 can be implemented in a variety of ways, as is well-known in the art. Interested readers are encouraged to consult, for example, U.S. Pat. No. 7,157,934, issued to John Teifel and Rajit Manohar, incorporated herein by reference in its entirety.

In some example embodiments, the acknowledge wires may correspond to a different number of ports based on the number of ports of the multi-port switch point 300. The programmable completion detection element 640 may be combined with the circuit implementation of the asynchronous buffer 610. This may result in a variety of benefits, including enhancing performance speed and reducing power consumption and fabrication cost (e.g., via a reduction in die area).

Figure 7:
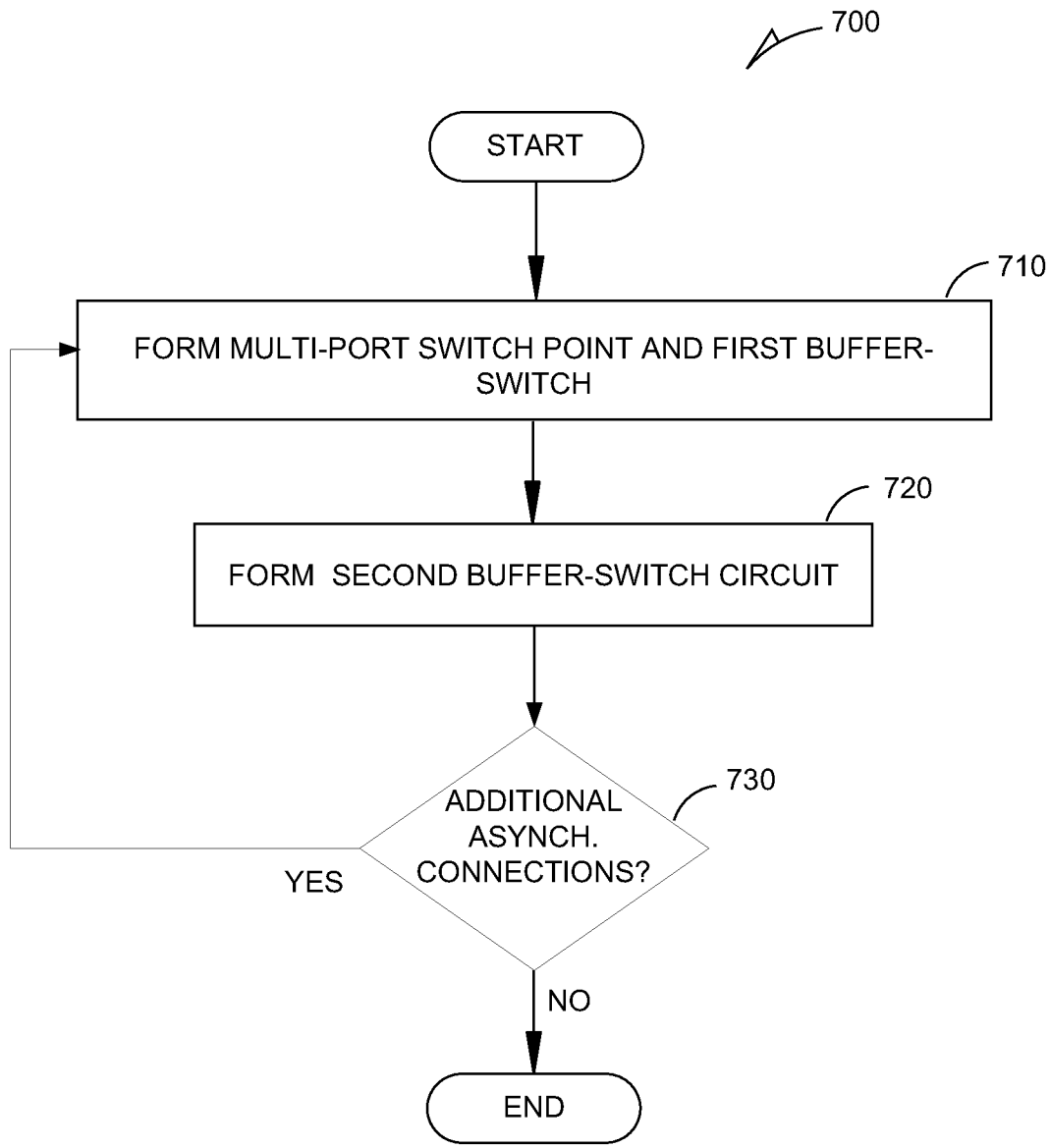
FIG. 7 is a flow diagram illustrating a method of forming of an asynchronous programmable interconnect with fan out support, according to various embodiments of the invention.

FIG. 7 is a flow diagram illustrating a method 700 of forming an asynchronous programmable interconnect with fan out support, according to various embodiments of the invention. At operation 710, the multi-port switch point 300 of FIG. 3 may be formed. The multi-port switch point 300 may comprise a first buffer-switch circuit 600 of FIG. 6 to provide a first set of programmable asynchronous connections between all ports of the multi-port switch point 300. The buffer-switch 600 may fan out multiple control signals (e.g., acknowledge signals) using the programmable completion detection element 640. At operation 720, a second buffer-switch circuit 500 of FIG. 5 may be formed. The buffer-switch circuit 500 may provide a second set of programmable asynchronous connections between a selected number of ports (e.g., N, S, and E) of the multi-port switch point 300 as discussed above with respect to FIG. 5.

At decision block 730, if no more asynchronous connections are to be formed, the method 700 ends. Otherwise, the control is transferred to operation 710 so that additional asynchronous connection can be formed. The multi-port switch point 300 may be formed by connecting nodes of the ports of the multi-port switch point 300 to wires of a routing track 102 (FIG. 1). Forming of the multi-port switch point may further involve connecting the first buffer circuit 610 (FIG. 6) to a number of of switch-boxes and a programmable completion detection element 640 (FIG. 6). The first buffer circuit 610 may be connected to the first and the second set 620 and 630 of switch-boxes (FIG. 6). The first and the second set 620 and 630 of switch-boxes may comprise multiple switch elements.

The ports of the multi-port switch point 300 may be programmably connected to the input 612 of the first asynchronous buffer circuit 610 using the first set of switch-boxes 620. Data nodes of the output 614 of the first asynchronous buffer circuit 610 may be programmably connected to the data nodes of the ports of the multi-port switch point 300 using the second set 630 of switch-boxes. Control nodes (e.g., acknowledge nodes) of the ports of the multi-port switch point 300 may be connected to inputs of the programmable completion detection element 640 (FIG. 6). The output 638 of the programmable completion detection element 640 may be connected to a control node of the output 614 of the asynchronous buffer circuit 610.

The second buffer-switch circuit 510 (FIG. 5) may be connected to provide a second set of programmable asynchronous connections between a selected number (e.g., 3) of the ports of the multi-port switch point 300. The second buffer-switch circuit 510 may be connected to the third and fourth set 520 and 530 of switch boxes. The third set 520 of switch boxes may programmably connect the selected number of ports of the multi-port switch point 300 to an input (e.g., L1) of the second asynchronous buffer circuit 510. The fourth set 530 of switch boxes may programmably connect an output (e.g., R1) of the second asynchronous buffer circuit 510 to the selected number of ports of the multi-port switch point 300.

Returning to FIG. 1, it should be noted that each connection block 110 may contain a set of connection points that enable an input or output of the logic block 101 to be connected to a number of routing tracks 102.

Figure 8:
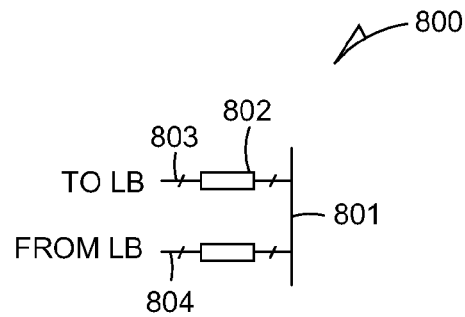
FIG. 8 is a block diagram illustrating an example connection point of the connection blocks (CB) shown in FIG. 1, according to various embodiments of the invention.

For example, FIG. 8 is a block diagram illustrating an example connection point 800 of the connection blocks 110 shown in FIG. 1, according to various embodiments of the invention. The connection point 800 shown in FIG. 8 uses switches 802 to selectively connect the endpoints 803 and 804 (e.g., input or output) of some logic blocks 101 to a routing track 801.

The difference between a connection point (e.g., connection point 800) and a switch point (e.g., the multi-port switch point 300 of FIG. 3) is that the connection point does not include any support for partitioning a routing track. For instance, an individual routing track 801 can be "cut" into two tracks using the multi-port switch point 300 and by an appropriate setting of the switches. This is not possible using the connection point 800 as shown in FIG. 8.

For the same reason that the multi-port switch point 300, as implemented using the buffer-switch circuits 400 and 402 in FIG. 4, does not support fan out, the connection point 800 using the multi-port switch point 300 with this implementation does not support fan-out either. To modify the connection point 800 to provide fan out support, we can treat the connection point 800 as a three-port switch point and use a modified form of the multi-port switch point described in FIGS. 5 and 6 (suitably modified for the reduced number of ports).

In an example embodiment, the asynchronous buffers 510 and 610 may be completely eliminated, thereby reducing pipelining. The pipelined asynchronous buffers can simply be replaced by a wire, or by conventional signal drivers. This is a valid alternative for a switch point as well as a connection point. In an alternative embodiment, the entire programmable multi-port switch may be bypassed for data rails (e.g., data wires 211 and 212 of FIG. 2), connecting corresponding data rails from the routing track 801 to each other (as in connection point 800, but just for the data rails). This type of change may be more suitable for the connection point 800, because it corresponds more closely to the types of changes used in conventional connection points.

For acknowledge wires (e.g., wire 213 of FIG. 2), the programmable completion detection element 640 may be used to support fan out as described above with respect to FIG. 6. When the routing track 801 is directional, it is driven from one side. In this case, an easier way to organize the switch block (such as switch block 111 of FIG. 1) may exist.

Figure 9:
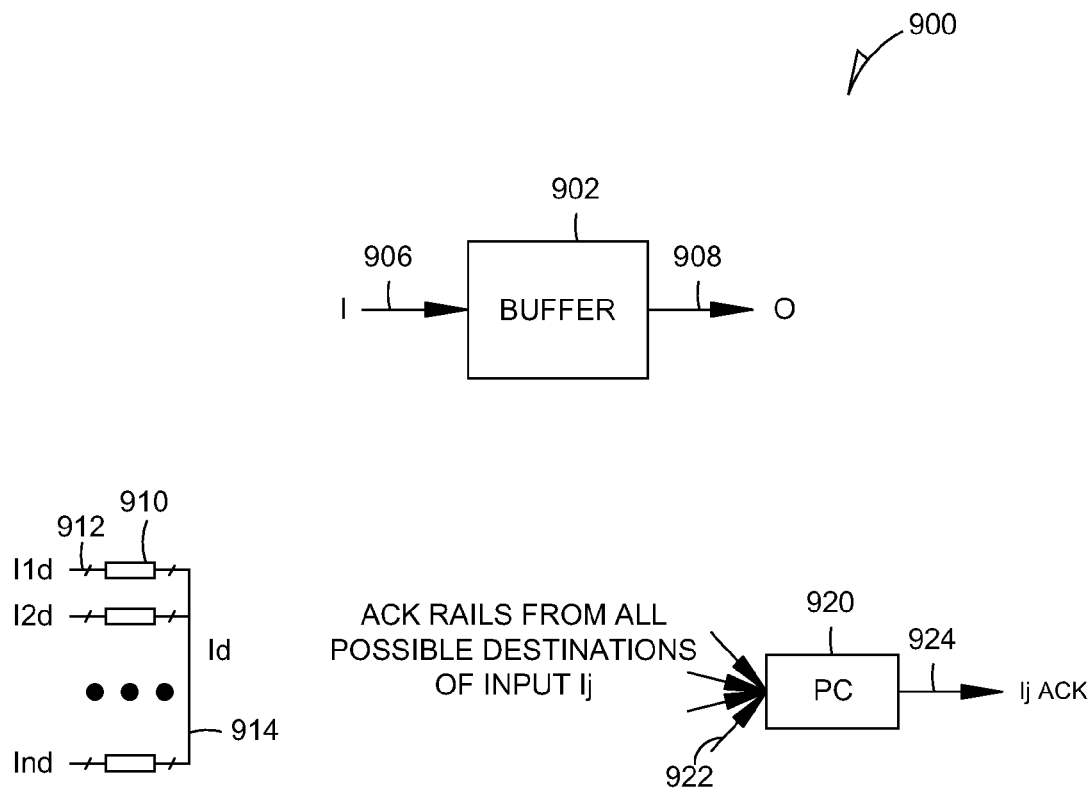
FIG. 9 is a block diagram illustrating an example unidirectional buffer-switch circuit, according to various embodiments of the invention.

For example, FIG. 9 is a block diagram illustrating an example unidirectional buffer-switch circuit 900, according to various embodiments of the invention. In FIG. 9, since the tracks are directional, each track (e.g., track 908) may see an output of an asynchronous buffer (e.g. asynchronous buffer 902) as driving the track.

In some example embodiments, the input 906 to the asynchronous buffer 902 can be connected to a variety of possible tracks, based on the connectivity supported by the switch block 111 of FIG. 1. The switch block 111 can be heterogeneous, in which case different buffers in the switch block might have a different number of possible tracks and connectivity. Alternatively, the input to the switch block 111 may also comprise a connection from a logic block 101, in which case the function of the connection block 110 and switch block 111 is partially merged, as is known to those having ordinary skill in the art.

To support an appropriate selective connectivity, the data rails from all possible inputs 912 may be connected to the asynchronous buffer 902 through its primary input 906 via switch-boxes 910 (connected at endpoint 914). For each input that might be connected to a track, all the acknowledge rails from its possible destinations 922 may be collected using a programmable completion detection element 920 to generate the acknowledge signal 924 for the appropriate input to an acknowledge node of the input 906 to the asynchronous buffer 902.

There are a number of variants of this basic scheme that should now be evident to those having ordinary skill in the art. Examples of such variations include having a mixture of pipelined buffers and signal buffers to implement multi-port switch points (e.g., multi-port switch point 300 of FIG. 3) or connection points (e.g., connection point 800 of FIG. 8), having partial switches on data rails versus having switches on data rails, etc. These options result in a variety of trade-offs in flexibility, cost (die area), performance, and power consumption for the implemented interconnect, and the actual implementation used will depend on the nature of the application and the utility of various metrics.

According to various embodiments, synchronous implementations of the same basic principles may also be possible. For example, it is well known that an asynchronous handshake can be emulated using synchronous circuit techniques. A synchronous communication protocol that has flow control (with valid bits, for example) may be an example of a way to emulate the asynchronous nature of the above-discussed interconnects using synchronous logic, and should be understood by those having ordinary skill in the art. These implementations may be considered as extensions to the mechanisms described.

Embodiments of asynchronous programmable interconnect circuits with fan out support, and methods of forming them, have been described. Implementing such circuits may result in reduced power consumption, reduced die area, and increased processing speed. Although the present embodiments have been described, it will be evident that various modifications and changes may be made to these embodiments. Accordingly, the specification and drawings are to be regarded in an illustrative rather than a restrictive sense.

The Abstract of the Disclosure is provided to comply with 37 C.F.R. §1.72(b), requiring an abstract that allows the reader to quickly ascertain the nature of the technical disclosure. It is submitted with the understanding that it will not be used to interpret or limit the claims. In addition, in the foregoing Detailed Description, it may be seen that various features are grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:

1. A circuit comprising:
a multi-port switch point to be used in a switch block or a connection block to couple to one or more logical blocks, the multi-port switch point comprising
a plurality of ports;
a first buffer-switch circuit comprising
a first buffer circuit;
a first number of input switch-boxes to programmably couple the ports to an input of the first buffer circuit;
a first number of output switch-boxes to programmably couple an output of the first buffer circuit to the ports to provide programmable asynchronous connections to transmit data and control signals, each of the first number of input switch boxes and output switch boxes being connected to a data wire of a routing track; and
a programmable completion detection element that combines control signals from control nodes of the ports to provide a combined control signal at a control node of the output of the first buffer circuit, the combined control signal including a combined acknowledge signal for data transmissions of the first buffer-switching circuit; and
a second buffer-switch circuit comprising
a second buffer circuit;
a second number of input switch-boxes to programmably couple the ports to an input of the second buffer circuit; and
a second number of output switch-boxes to programmably couple an output of the second buffer circuit to the ports to provide programmable asynchronous connections to transmit data and control signals, the second number being less than the first number.

2. The circuit of claim 1, wherein each port of the multi-port switch point comprises of a plurality of nodes, each node connected to a wire of a routing track.

3. The circuit of claim 2, wherein the routing track is to interconnect the one or more logical blocks, the one or more logical blocks comprising an asynchronous circuit.

4. The circuit of claim 1, wherein the plurality of ports comprises four ports, each port of the four ports comprising a plurality of nodes.

5. The circuit of claim 4, wherein the switch boxes of the first number of input switch-boxes, the first number of output switch-boxes, the second number of input switch-boxes and the second number of output switch-boxes each comprise transmission gates or transistors, the switch boxes being buffered or unbuffered.

6. The circuit of claim 1, wherein the programmable completion detection element receives acknowledge signals from the control nodes of the ports to provide a single acknowledge signal for the ports at the control node of the output of the first buffer circuit.

7. The circuit of claim 1, wherein:
the first buffer circuit comprises a first asynchronous buffer circuit that supports pipelining of data and control signals; and
the second buffer circuit comprises a second asynchronous buffer circuit that supports pipelining of data and control signals.

8. The circuit of claim 1, wherein the first number is four and the second number is three.

9. The circuit of claim 8, wherein:
the first buffer circuit comprises a first first-in-first-out (FIFO) buffer circuit to support pipelining of data and control signals; and
the second buffer circuit comprises a second first-in-first-out (FIFO) buffer circuit to support pipelining of data and control signals.

10. A circuit comprising:
a multi-port switch point to be used in a switch block or a connection block to couple to one or more logical blocks, the multi-port switch point comprising
a plurality of ports; and
a first buffer-switch circuit comprising
a first buffer circuit;
a first plurality of input switch-boxes to programmably couple the ports to an input of the first buffer circuit, each input switch-box being connected to a corresponding data wire of a corresponding routing track;
a first plurality of output switch-boxes to programmably couple an output of the first buffer circuit to the ports, each output switch-box being connected to a corresponding data wire of a corresponding routing track; and
a programmable completion detection element that combines control signals from control nodes of the ports to provide a combined control signal at a control node of the output of the first buffer circuit, the combined control signal including a combined acknowledge signal for data transmissions of the first buffer-switch circuit.

11. The circuit of claim 10, wherein:
the first buffer circuit comprises a first asynchronous buffer circuit and the first plurality of output switch-boxes are structured to programmably couple the output of the first asynchronous buffer circuit to data nodes of the ports; and
the programmable completion detection element is coupled to acknowledge wires of the ports, the combined control signal providing a combined acknowledge signal for data transmissions of the first buffer-switch circuit.

12. The circuit of claim 11, wherein:
each port comprises of a plurality of nodes, each node connected to a wire of a routing track;
each switch-box of the first plurality of input switch-boxes comprises a plurality of switch elements, each switch element being connected via a separate wire to one of the nodes of one of the ports or to a node of the input of the first buffer circuit; and
each switch-box of the first plurality of output switch-boxes comprises a plurality of switch elements, each switch element being connected via a separate wire to one of the nodes of one of the ports or to a node of the output of the first buffer circuit.

13. The circuit of claim 10, further comprising a second buffer-switch circuit to provide a second set of programmable asynchronous connections between all ports of the multi-port switch point.

14. The circuit of claim 13, wherein the second buffer-switch circuit comprises:
a second asynchronous buffer circuit; a second plurality of input switch boxes to programmably couple one of the ports to an input of the second asynchronous buffer circuit; and
a second plurality of output switch boxes to programmably couple an output of the second asynchronous buffer circuit to one of the ports.

15. A method comprising:
programmably coupling a first number of ports of a multi-port switch point to an input of a first buffer circuit;
programmably coupling an output of the first buffer circuit to the first number of the ports to provide first couplings between the first number of ports;
coupling each node of each port of the multi-port switch point to a wire of a routing track;
connecting control nodes of the ports to inputs of a programmable completion detection element and connecting an output of the programmable completion detection element to a control node of the output of the first buffer circuit, the programmable completion detection element combining control signals from the control nodes of the ports to provide a combined control signal at the control node of the output of the first buffer circuit, the control signals including acknowledge signals from the control nodes of the ports, and the combined control signal including a combined acknowledge signal for the ports;
programmably coupling a second number of the ports to an input of a second buffer circuit; and
programmably coupling an output of the second buffer circuit to the second number of the ports to provide couplings between the second number of ports wherein the second number is less than the first number.

16. The method of claim 15, comprising coupling the output of the first buffer circuit to a plurality of switch-boxes.

17. The method of claim 16, wherein coupling the output of the first buffer circuit to the plurality of switch-boxes comprises coupling the output of the first buffer circuit to a first and a second set of switch-boxes, each one of the first and the second set of switch-boxes comprising a plurality of switch elements.

18. The method of claim 17, wherein:
programmably coupling the first number of ports further comprises programmably coupling the first number of ports to an input of a first asynchronous buffer circuit through a first plurality of input switch-boxes;
programmably coupling the output of the first buffer circuit further comprises programmably coupling an output of the first asynchronous buffer circuit to the first number of the ports through a first plurality of output switch-boxes;
programmably coupling the second number of the ports further comprises programmably coupling the second number of the ports to an input of a second asynchronous buffer circuit through a second plurality of input switch-boxes; and
programmably coupling the output of the second buffer circuit further comprises programmably coupling an output of the second asynchronous buffer circuit to the second number of the ports through a second plurality of output switch-boxes.

19. A method comprising:
programmably coupling data nodes of a plurality of ports of a multi-port switch point to an input of a first buffer circuit;
programmably coupling an output of the first buffer circuit to the data nodes of the plurality of ports;
programmably coupling the data nodes of the plurality of ports to data wires of routing tracks; and
combining acknowledge signals from control nodes of the plurality of ports into a single acknowledge signal for data transmissions in the multi-port switch point, the single acknowledge signal being provided to a control node at the output of the first buffer circuit.

20. The method of claim 19, further comprising:
programmably coupling control nodes corresponding to the data nodes of the plurality of ports to control wires of the routing tracks, the acknowledge signals being combined by accessing the acknowledge signals from the control wires.

21. The method of claim 19, wherein the acknowledge signals are combined into the single acknowledge signal by a programmable completion detection element that accesses the acknowledge signals from the routing tracks.

22. An asynchronous integrated circuit comprising:
a plurality of logic blocks;
a plurality of tracks to interconnect the logic blocks; and
a plurality of switch blocks or connection blocks, at least one of the plurality of switch blocks or connection blocks comprising one or more multi-port switch points, each multi-port switch point of the one or more multi-port switch points being located at an intersection of two of the plurality of tracks and comprising a plurality of ports and a buffer-switch circuit, the buffer-switch circuit to provide a set of programmable asynchronous connections between all ports of the plurality of ports, the programmable asynchronous connections being used to transmit data and control signals, the buffer-switch circuit comprising
a buffer circuit;
a plurality of input switch-boxes to programmably couple the ports to an input of the buffer circuit;
a plurality of output switch-boxes to programmably couple an output of the buffer circuit to the ports, each of the input switch boxes and output switch boxes being connected to a data wire of a routing track; and
a programmable completion detection element that combines control signals from control nodes of the ports to provide a combined control signal at a control node of the output of the buffer circuit, the combined control signal including a combined acknowledge signal for data transmissions of the first buffer-switching circuit.

* * * * *

UNITED STATES PATENT AND TRADEMARK OFFICE
CERTIFICATE OF CORRECTION

PATENT NO. : 8,964,795 B2  
APPLICATION NO. : 12/475744  
DATED : February 24, 2015  
INVENTOR(S) : Manohar et al.

Page 1 of 1

It is certified that error appears in the above-identified patent and that said Letters Patent is hereby corrected as shown below:

In the specification,

In column 1, line 66, delete "multiport" and insert --multi-port--, therefor

In column 4, line 45, delete "304" and insert --301--, therefor

In column 4, line 51, delete "432E" and insert --432 E--, therefor

In column 4, line 63-64, delete "multiport switch" and insert --multi-port switch point--, therefor In column 7, line 55, delete "fan-out" and insert --fan out--, therefor In the claims, In column 9, line 66, in Claim 5, delete "switch boxes" and insert --switch-boxes--, therefor Signed and Sealed this  
Twenty-first Day of June, 2016

Michelle K. Lee  
*Director of the United States Patent and Trademark Office*